(12) United States Patent
Chang et al.

(10) Patent No.: US 7,478,774 B2
(45) Date of Patent: Jan. 20, 2009

(54) SPINNING REEL

(75) Inventors: Chung-Liang Chang, 3F, No. 40, Chieh-Shou Street, Panchiao City, Taipei Hsien (TW); Chang-Tsung Chang, Taipei Hsien (TW)

(73) Assignee: Chung-Liang Chang, Taipei Hsien (TW)

( * ) Notice: Subject to any disclaimer, the term of this patent is extended or adjusted under 35 U.S.C. 154(b) by 0 days.

(21) Appl. No.: 12/134,197

(22) Filed: Jun. 6, 2008

(65) Prior Publication Data

US 2008/0302899 A1 Dec. 11, 2008

(30) Foreign Application Priority Data

Jun. 8, 2007 (TW) ................. 096120708
Apr. 24, 2008 (TW) ................. 097115088

(51) Int. Cl.
*A01K 89/01* (2006.01)
(52) U.S. Cl. .................. 242/229; 242/249; 242/322; 242/310
(58) Field of Classification Search ................. 343/229, 343/249, 322, 310, 250, 251, 323, 241; D22/140, D22/141
See application file for complete search history.

(56) References Cited

U.S. PATENT DOCUMENTS

| | | | | |
|---|---|---|---|---|
| 1,617,543 A * | 2/1927 | Roberts | ................ | 242/229 |
| 2,535,746 A * | 12/1950 | Mitchell | ................ | 242/229 |
| 2,612,325 A * | 9/1952 | Johnson | ................ | 242/229 |
| 2,613,046 A * | 10/1952 | Redding | ................ | 242/229 |
| 2,633,307 A * | 3/1953 | Morgan et al. | ................ | 242/229 |
| 2,749,057 A * | 6/1956 | Jenkins et al. | ................ | 242/229 |
| 3,039,716 A * | 6/1962 | Visockis | ................ | 242/229 |
| 3,155,340 A * | 11/1964 | King | ................ | 242/229 |
| 3,384,320 A * | 5/1968 | Hawk | ................ | 242/229 |
| 3,944,159 A * | 3/1976 | Dobbs | ................ | 242/229 |
| 4,019,693 A * | 4/1977 | Lesage | ................ | 242/229 |
| 4,106,717 A * | 8/1978 | Thiel | ................ | 242/229 |
| 5,230,484 A * | 7/1993 | Stevenson | ................ | 242/227 |
| 6,561,448 B2 * | 5/2003 | Barker | ................ | 242/229 |
| 2002/0027177 A1 * | 3/2002 | Barker | ................ | 242/249 |

* cited by examiner

*Primary Examiner*—Emmanuel M Marcelo

(57) ABSTRACT

A spinning reel includes a body, which has two sliding plates coupled to two opposite lateral sides of the base thereof, a spool holder, which has a U-shaped frame pivotally mounted in the base of the body and a spool pivotally coupled to the U-shaped frame, a spool rotating mechanism, which has two pins axially movable to engage the spool and a gear set mounted on one pin for rotating the spool to take up a fishing line, and a spool biasing mechanism, which has a drive gear set, a operating bar for operation by a person to rotate the drive gear set, a driven gear set coupled to the drive gear set and rotatable to move the sliding plates in moving the pins of the spool rotating mechanism into engagement with spool or away from the spool, and a transmission device coupled between the driven gear set and the spool holder for causing the spool holder to be biased between a horizontal position and a vertical position upon rotation of the drive gear set by the operating bar.

16 Claims, 14 Drawing Sheets

SPINNING REEL

This application claims the priority benefit of Taiwan patent application number 096120708 and 097115088 filed on Jun. 8, 2007 and Apr. 24, 2008 respectively.

BACKGROUND OF THE INVENTION

1. Field of the Invention

The present invention relates to fishing gear means and more particularly, to a spinning reel for fishing, which allows the spool to be selectively set between a vertical position for enabling the user to throw the fishing line conveniently with less effort, and a horizontal position for enabling the user to take up the fishing line smoothly and rapidly.

2. Description of the Related Art

Following lifting of living standards, people pay more attention to their needs of entertainment and recreational activities. During the weekend, people to go outdoors to participate different sports games or outdoor activities, such as hill walking, climbing, trekking, kayaking, rafting, water sports, snow sports, and etc. Nowadays, many people go fishing for adventure and outdoor entertainment. Fishing activities include pond fishing, river fishing and sea fishing. Further, fishing is a practice with various techniques and has been transformed by modern technological developments. In addition to providing food through harvesting fish, modern fishing is both a recreational and professional sport.

Further, sea fishing includes boat fishing, rock fishing and seashore fishing. When go fishing, a fishing tackle and related accessories should be prepared. Further, a fishing pole may be equipped with a spinning reel or trolling reel for winding a fishing line. FIG. 13 illustrates a spinning reel according to the prior art. According to this design, the spinning reel comprises a base A, which has a pole mount A1 at one side for fastening to a fishing pole, a rotary rack B pivoted to the base A, a spool B1 vertically coupled to the rotary rack B and kept in parallel to the fishing pole and having a fishing line D wound thereon, a bail B2 pivoted to the base B, and a handle C for rotating the spool B1. When wishing to throw the fishing line D into the water, lift the bail B2 to pull out the fishing line D. At this time, the fishing line D does not causes the spool B1 to rotate, and the user can throw the fishing line D with less resistance. When wishing to take up the fishing line D, operate the handle C to rotate the spool B1, causing the fishing line D to be guided by a guide roller B21 at the bail B2 through about 90-degrees and wound on the spool B1. This winding operation has low pull out force, and therefore the spool B1 cannot be rotated smoothly at a high speed to take up the fishing line D efficiently.

FIG. 14 shows a conventional trolling reel. According to this design, the trolling reel comprises a base A, a pole mount A1 extended from one side of the base A and fastened to a fishing pole, a spool B1 pivotally mounted in the base A and kept in a horizontal position perpendicular to the fishing pole, a horizontal guide rod B3 suspending in the base A, and a slide B4 coupled to and movable along the horizontal guide rod B3. The slide B4 has a guide ring B41 for the passing of a fishing line D. When throwing the fishing line D, the fishing line D is extending out of the spool B1 through the guide ring B41 of the slide B4, and the spool B1 is rotated with the let-off motion of the fishing line D, producing a resistance to the fishing line D. Therefore, the user cannot throw the fishing line D of this design of trolling reel for a long tidstance. When taking up the fishing line D, operate the handle C to rotate the spool B1, causing the spool B1 to take up the fishing line D directly.

Therefore, the aforesaid two prior art designs are still not satisfactory in function, and there is a demand for a spinning reel that allows the spool to be selectively set between a horizontal position and a vertical position so that the fishing line can be thrown into the water smoothly with less resistance or taken up with a high pull out force.

SUMMARY OF THE INVENTION

The present invention has been accomplished under the circumstances in view. It is the main object of the present invention to provide a spinning reel, which allows the spool to be selectively set between a vertical position where the spool is kept in parallel to the fishing pole for enabling the user to throw the fishing line conveniently with less effort, and a horizontal position where the spool is kept perpendicular to the fishing pole for rotation to take up the fishing line smoothly and rapidly.

To achieve this and other objects of the present invention, the spinning reel comprises a body, a spool holder, a spool rotating mechanism and a spool biasing mechanism. The body comprises a base. The base comprises an accommodation chamber, two connection portions respectively disposed at front and back sides thereof, and two sliding plates coupled to two opposite lateral sides of the base. The spool holder is accommodated in the accommodation chamber, comprising a U-shaped frame pivotally coupled between the two connection portions of the base and a spool perpendicularly pivotally coupled to the U-shaped frame. The spool rotating mechanism comprises two pins axially movable between a first position where the pins are respectively coupled to the spool, and a second position where the pins are respectively disengaged from the spool, and a gear set mounted on one pin for rotating the spool to take up a fishing line. The spool biasing mechanism comprises a drive gear set, a operating bar for operation by a person to rotate the drive gear set, a driven gear set coupled to the drive gear set and rotatable to move the sliding plates of the body in moving the pins of the spool rotating mechanism between the first position and the second position, and a transmission device coupled between the driven gear set and the spool holder for causing the spool holder to be biased between a horizontal position and a vertical position upon rotation of the drive gear set by the operating bar.

DETAILED DESCRIPTION OF THE PREFERRED EMBODIMENT

Referring to FIGS. 1~5, a spinning reel in accordance with the present invention is shown comprising a body 1, a spool holder 2, a spool rotating mechanism 3 and a spool biasing mechanism 4.

Figure 1:
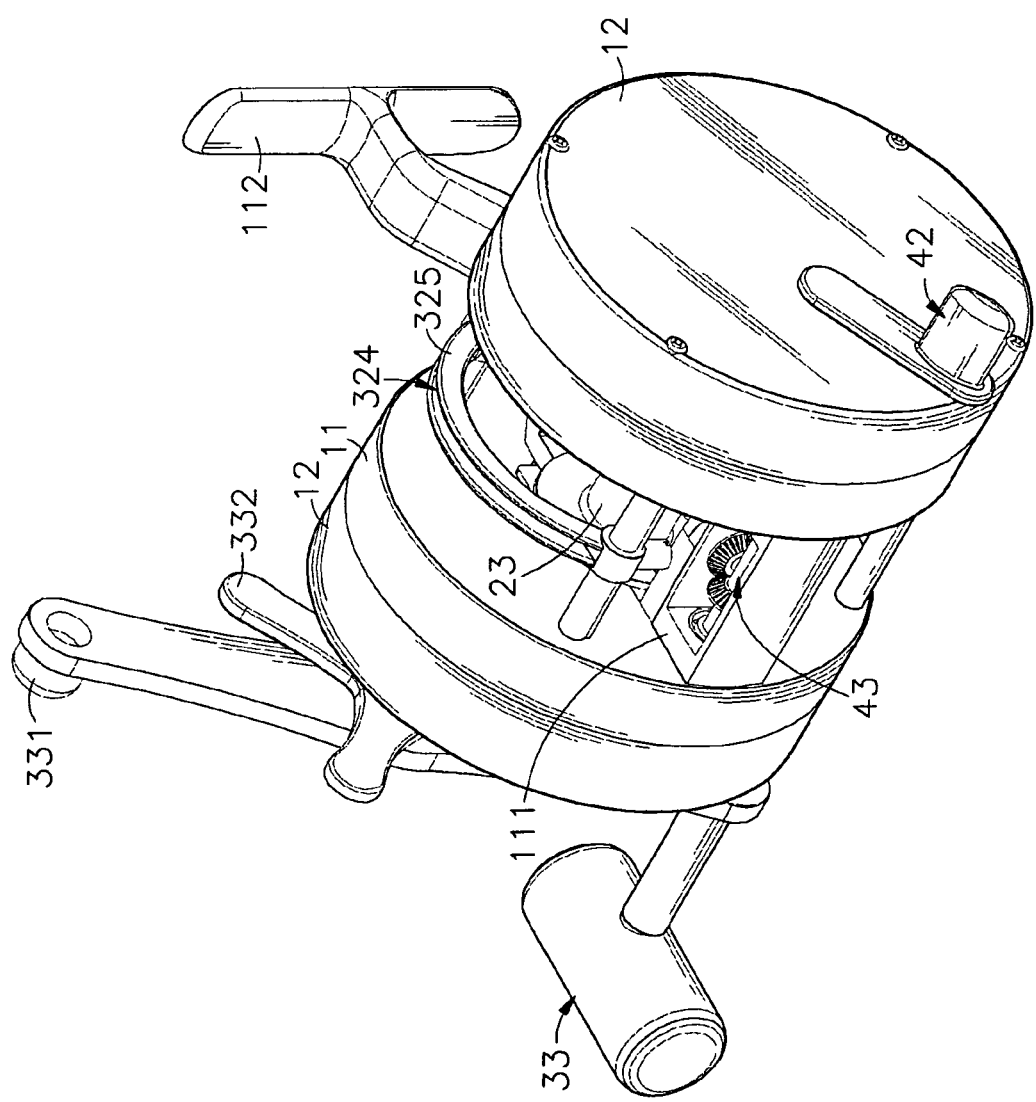
FIG. 1 is an elevational view of a spinning reel in accordance with the present invention.
Figure 2:
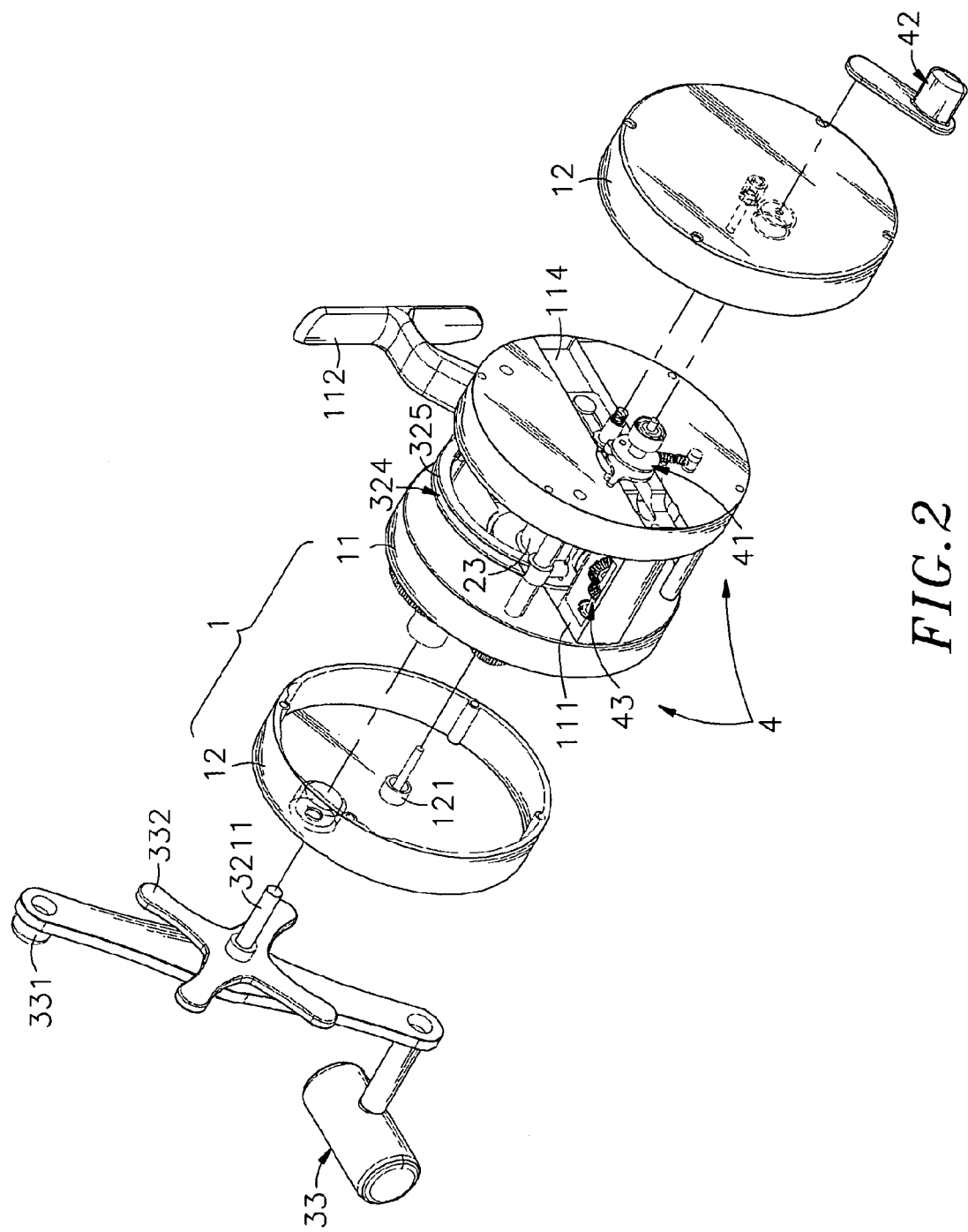
FIG. 2 is an exploded view of the spinning reel in accordance with the present invention.
Figure 3:
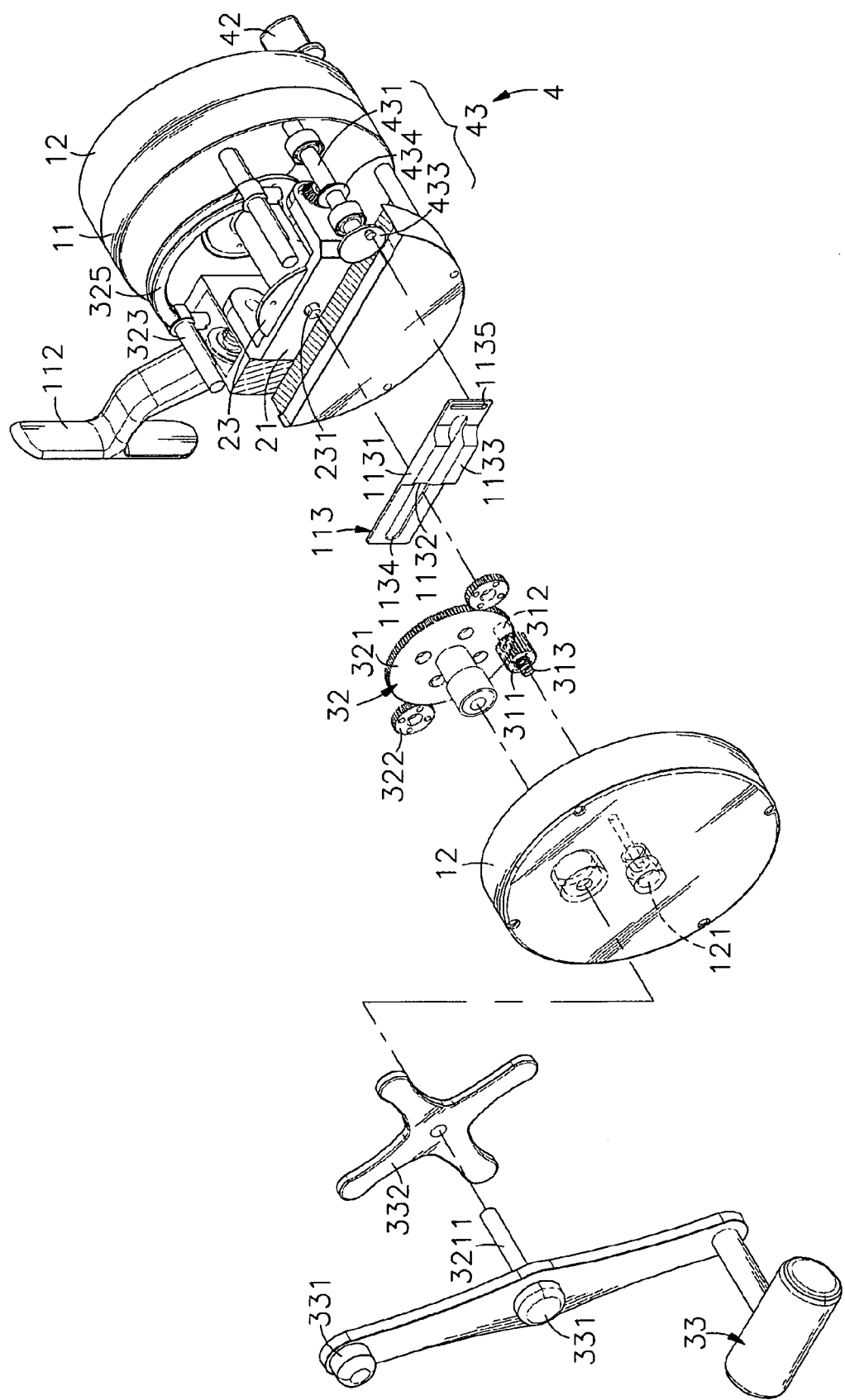
FIG. 3 is an exploded view, partially in sectional elevation of the spinning reel in accordance with the present invention.
Figure 4:
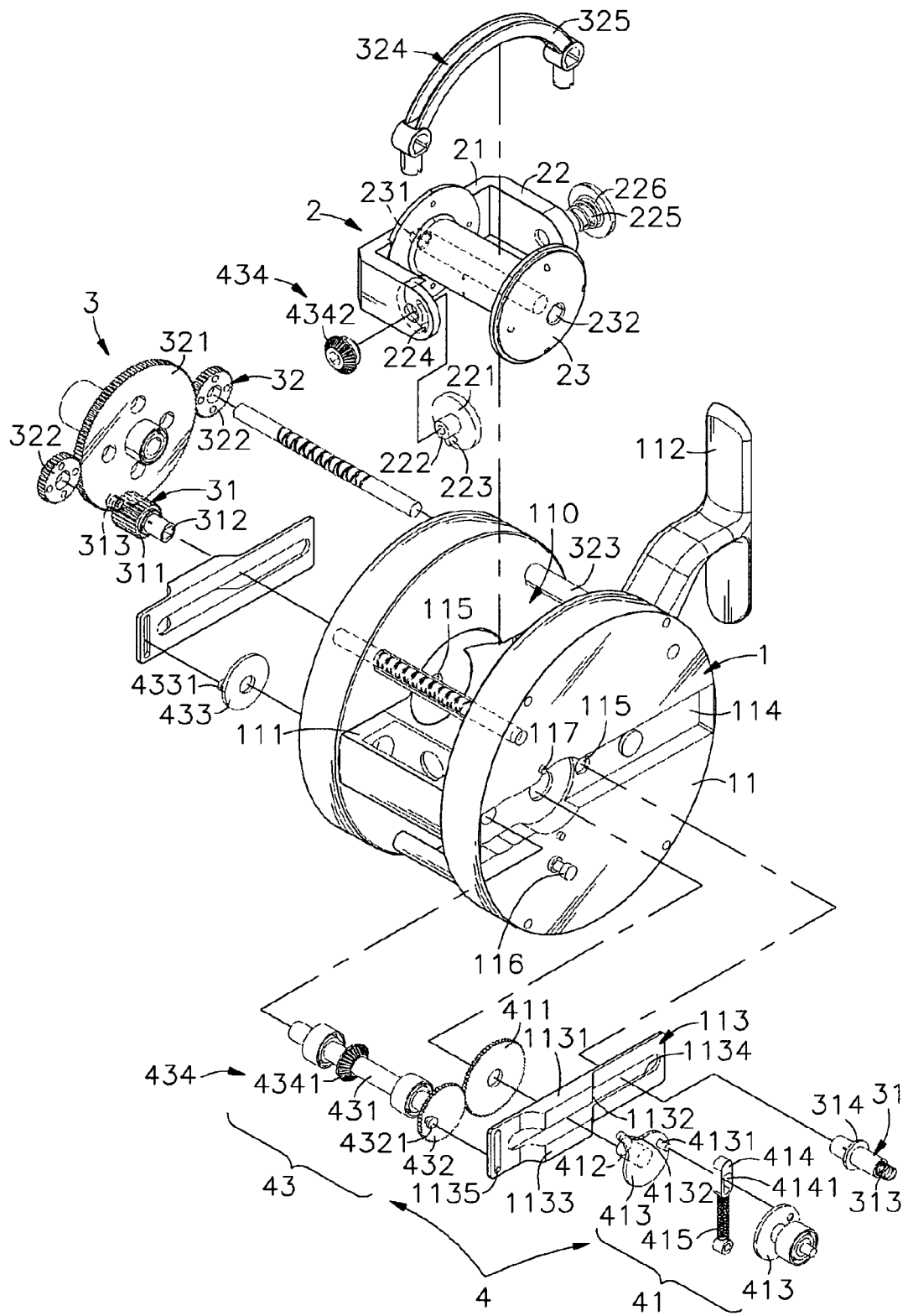
FIG. 4 is another exploded view of the spinning reel in accordance with the present invention.
Figure 5:
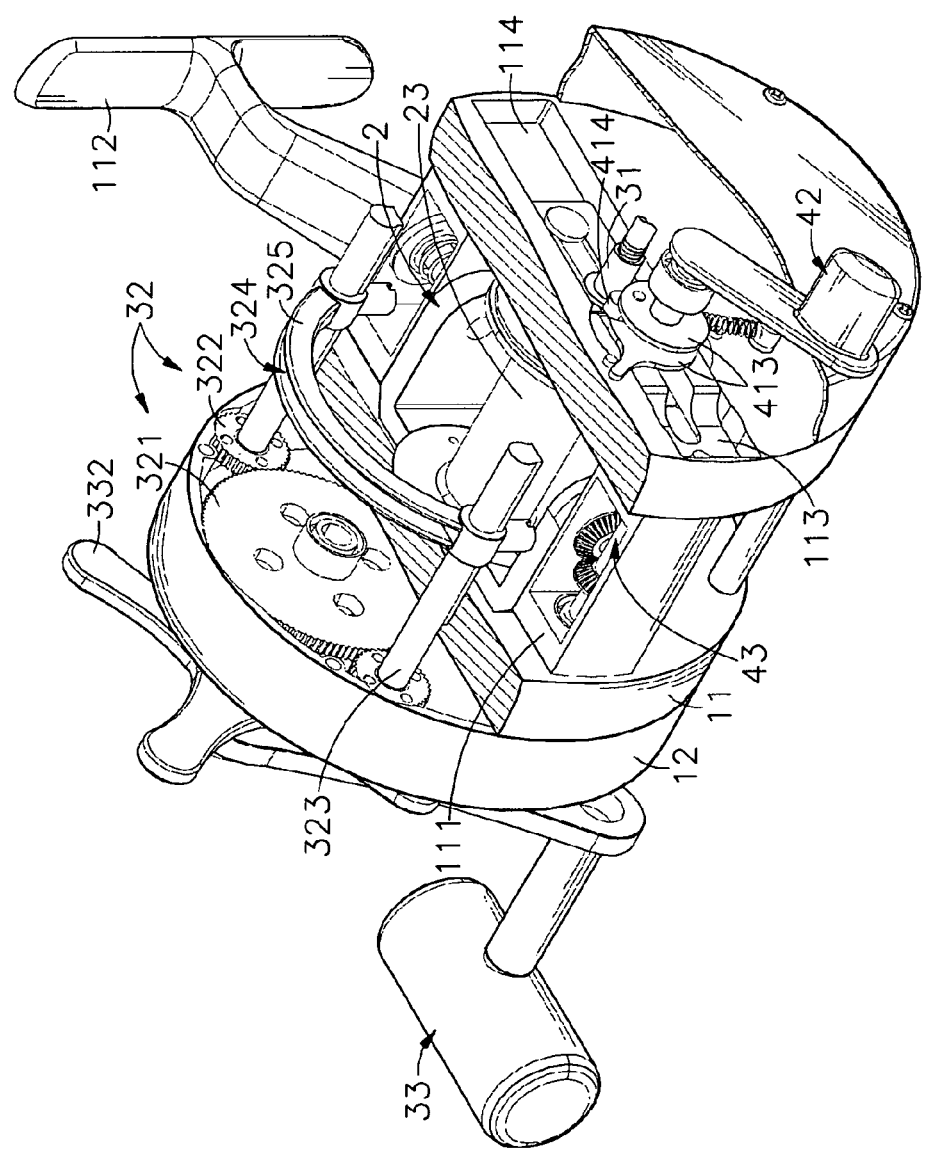
FIG. 5 is a sectional elevational view of the spinning reel in accordance with the present invention.
Figure 6:
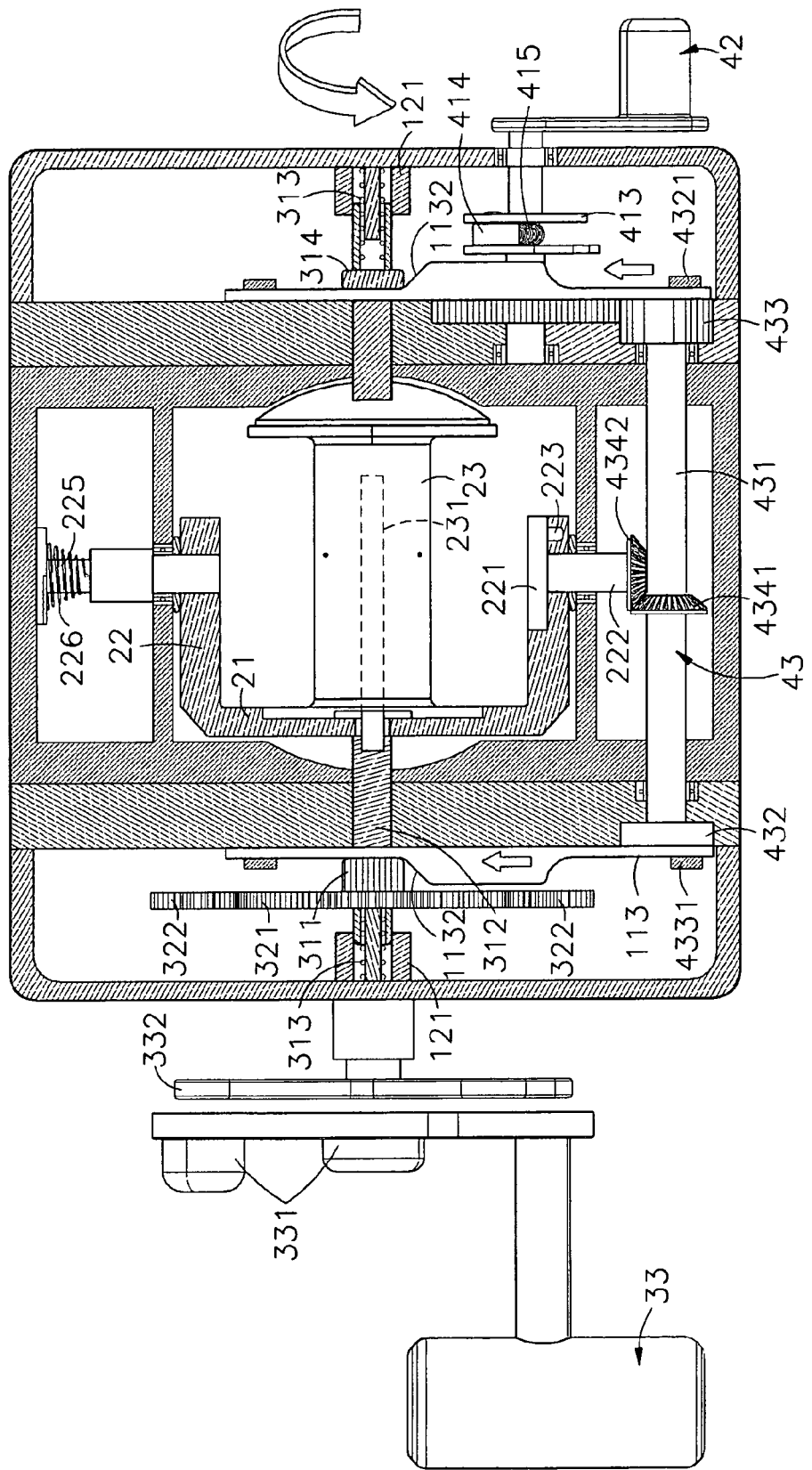
FIG. 6 is a sectional top view of the spinning reel in accordance with the present invention.
Figure 7:
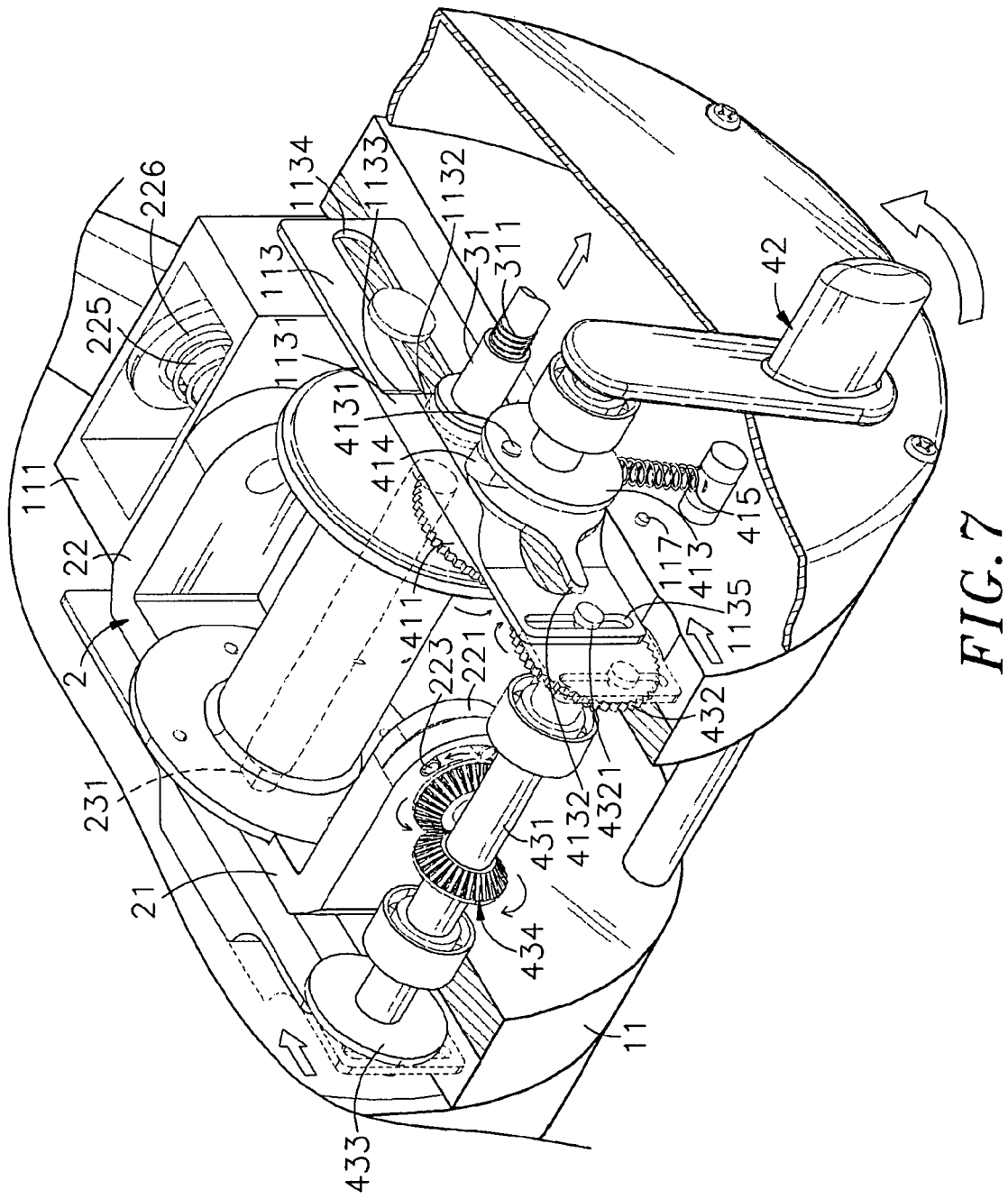
FIG. 7 is a perspective, sectional elevational view of the spinning reel in accordance with the present invention.
Figure 8:
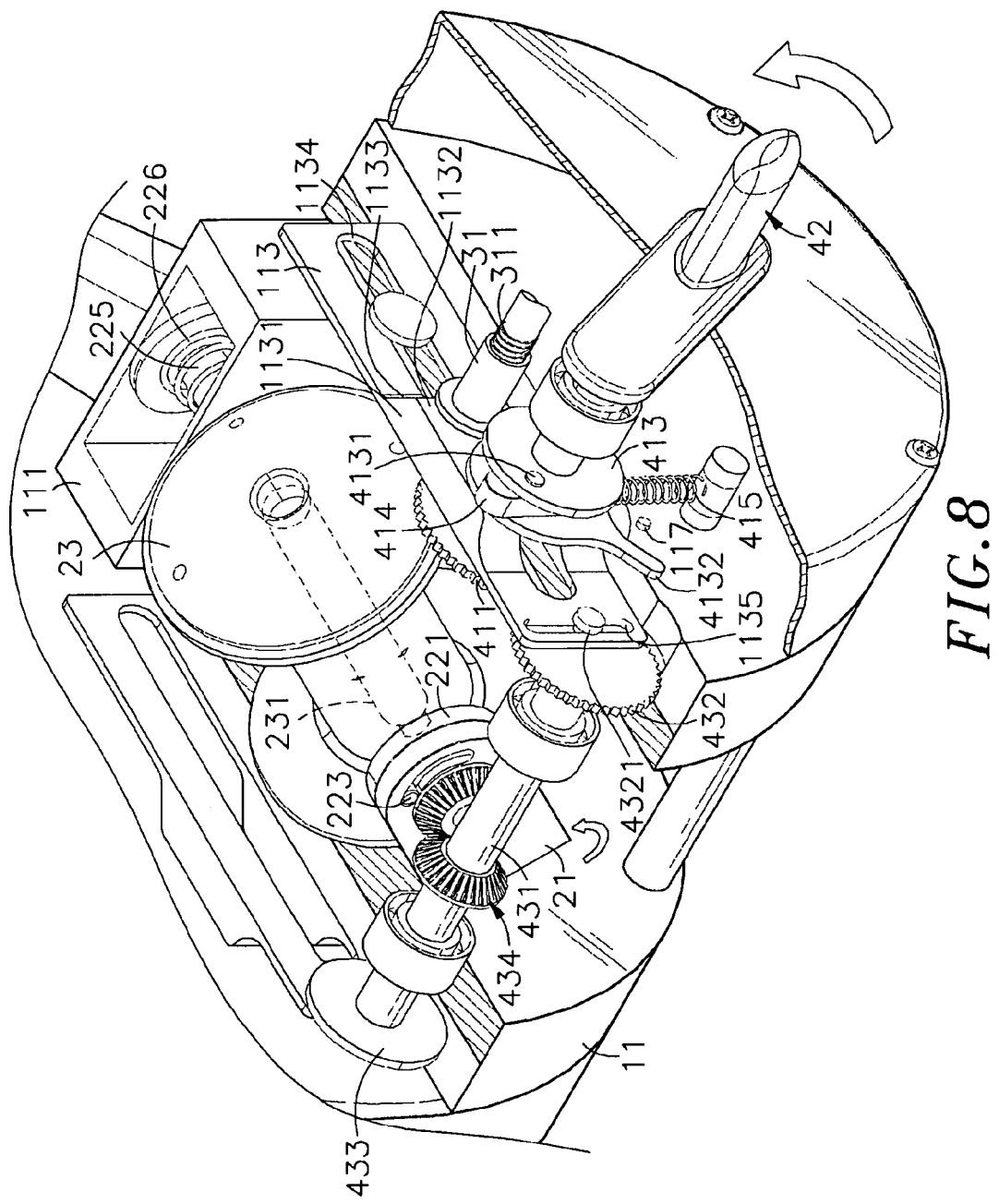
FIG. 8 corresponds to FIG. 7, showing a biasing action of the spool holder.
Figure 9:
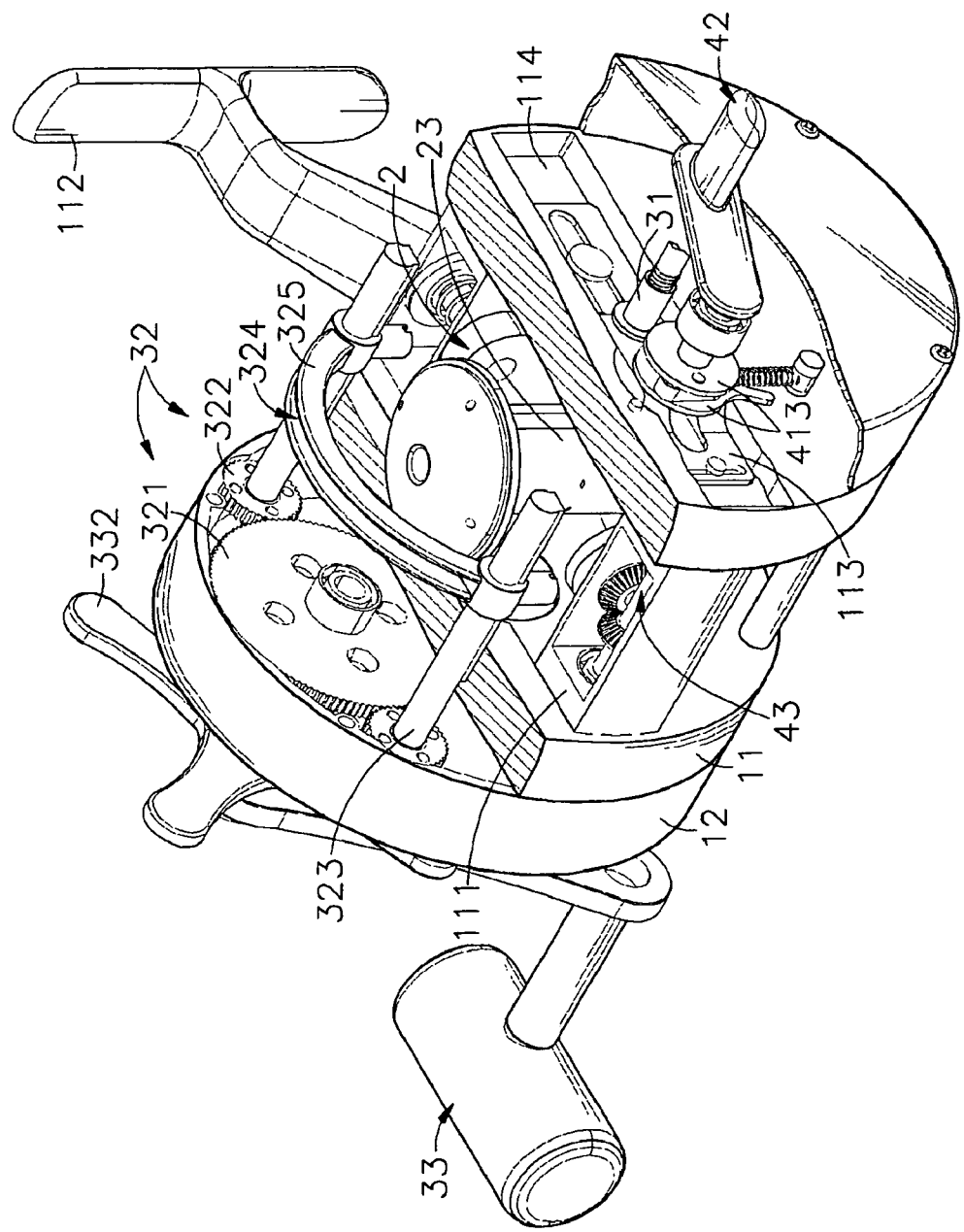
FIG. 9 is a sectional elevation of the present invention, showing the spool holder biased to the vertical position.
Figure 10:
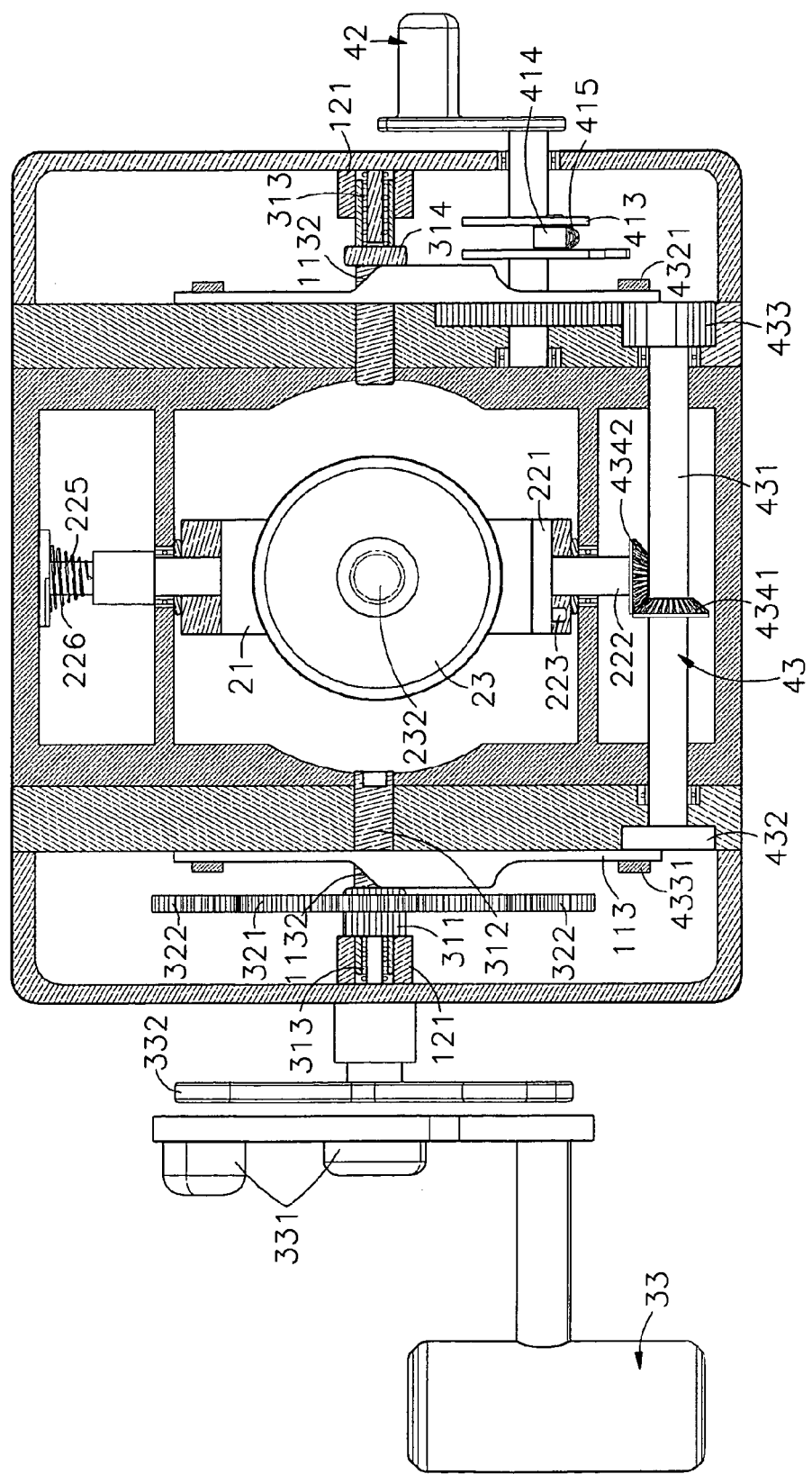
FIG. 10 corresponds to FIG. 6, showing the spool holder biased to the vertical position.
Figure 11:
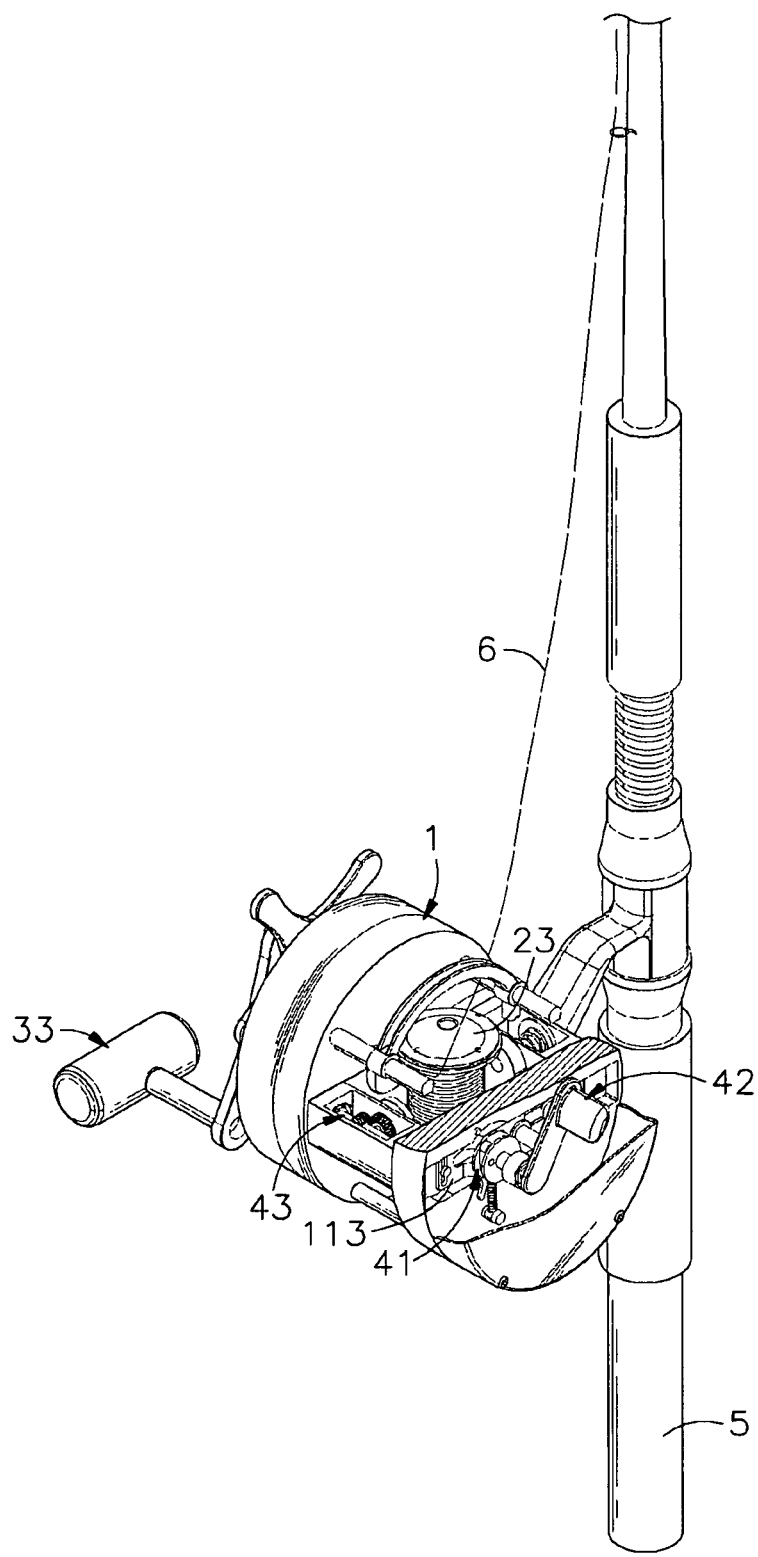
FIG. 11 is an applied view of the present invention, showing the spinning reel fastened to a fishing pole and the spool holder in the vertical position.

The body 1 comprises a base 11 and two caps 12. The base 11 defines an accommodation chamber 110, which accommodates the rotation holder 2, at least one, for example, two connection portions 111 respectively disposed at front and back sides of the accommodation chamber 110, a pole mount 112 extending from the rear-sided connection portion 111 for fastening to a fishing pole 5 (see FIG. 11), two sliding grooves 114 respectively transversely disposed at two opposite lateral sides, two sliding plates 113 respectively slidably coupled to the sliding grooves 114, and two axle holes 115 cut through the center of each of the sliding grooves 114 and longitudinally aligned in line in communication with the accommodation chamber 110 at two sides. Each sliding plate 113 has a trapezoidal protrusion 1131, a narrow opening 1134 cut through the trapezoidal protrusion 1131 corresponding to one sliding groove 114 of the base 11, and a sliding slot 1135 disposed near one end and extending in direction perpendicular to the extending direction of the narrow opening 1134. The trapezoidal protrusion 1131 has a top bearing face 1133 and a beveled guide face 1132 at one side of the top bearing face 1133.

The caps 12 are respectively capped on the two opposite lateral sides of the base 11, each having a center axle sleeve 121 corresponding to the axle holes 115 of the base 11.

The spool holder 2 comprises a U-shaped frame 21, which has two parallel arms 22 and a smoothly arched sliding slot 224 near the free end of one arm 22, a wheel 221, which has a wheel axle 222 inserted through one arm 22 that carries the smoothly arched sliding slot 224 and pivotally coupled to the front-sided connection portion 111 of the base 11 of the body 1 and a guide rod 223 inserted into the smoothly arched sliding slot 224 to guide rotary motion of the wheel 221 relative to the U-shaped frame 21 within a limited angle, a pivot shaft 225 perpendicularly pivotally coupled to the other arm 22 of the U-shaped frame 21, a return spring 226 coupled between the pivot shaft 225 and the U-shaped frame 21 and adapted for returning the pivot shaft 225 after each rotary motion, and a spool 23 perpendicularly pivotally coupled to the U-shaped frame 21 and spaced between the arms 22 in a parallel manner for the winding of a finishing line 6 (see FIG. 11), having a spool axle 231 axially disposed at the center of one end and a coupling hole 232 disposed at center of the other end.

The spool rotating mechanism 3 is comprised of two pins 31, a gear set 32 and a handle 33. The pins 31 are respectively inserted through the narrow openings 1134 of the sliding plates 113 and the axle holes 115 of the base 11, and axially movable between a first position to engage the spool 23 of the spool holder 2 and a second position to release the spool 23. One pin 31 has one end terminating in a coupling portion 312 and coupled to the spool axle 231 of the spool 23, a pinion 311 fixedly mounted on the periphery thereof, and the other end mounted with a spring 313 and coupled to the center axle sleeve 121 of one cap 12. The other pin 31 has its one end coupled to the coupling hole 232 of the spool 23, a collar 314 extending around the periphery on the middle, and its other end mounted with a spring 313 and coupled to the center axle sleeve 121 of the other cap 12. The gear set 32 comprises a center gear wheel 321 meshed with the pinion 311 and rotatable to drive the pinion 311 in rotating the spool 23, two transmission gears 322 meshed with the center gear wheel 321 at two opposite lateral sides, two guide rods 323 respectively fixedly connected to the transmission gears 322 and suspending in the accommodation chamber 110 of the base 11 of the body 1, a smoothly arched slide 324 coupled to the guide rods 323 and defining a guide groove 325 for guiding the fishing line 6 toward the spool 23 for winding. Further, the center gear wheel 321 has a wheel axle 3211 connected thereto. The handle 33 is fastened to the wheel axle 3211 with nuts 331 and a packing member 332.

The spool biasing mechanism 4 is comprised of a drive gear set 41, a operating bar 42 and a driven gear set 43. The drive gear set 41 comprises a drive gear 411, a transmission gear shaft 412 fixedly connected to the drive gear 411 and inserted through the narrow opening 1134 of the sliding plate 113 in the right-sided sliding groove 114 of the base 11 and connectable to the operating bar 42, two limiter plates 413 coupled between the transmission gear shaft 412 and the operating bar 42, a movable block 414 suspending between the two limiter plates 413 and having an elongated slot 4141, a connection rod 4131 inserted through the elongated slot 4141 of the movable block 414 and eccentrically connected between the two limiter plates 413, and a buffer spring 415 connected between one end of the movable block 414 and a rod 116 at one lateral side of the base 11 of the body 1. One limiter plate 413 has a protruding rod 4132 protruded from the periphery and movable with the limiter plates 413 between two stop rods 117 at one lateral side of the base 11 of the body 1 to limit the turning angle of the limiter plates 413 during rotation of the limiter plates 413 with the transmission gear shaft 412 and the drive gear 411. The driven gear set 43 comprises a driven gear shaft 431 rotatably inserted through the two opposite lateral sides of the base 11 of the body 1, a driven gear 432 fixedly mounted on the one end of the driven gear shaft 431 and meshed with the drive gear 411 of the drive gear set 41 and having an eccentric rod 4321 inserted through the sliding slot 1135 of one sliding plate 113 of the body 1, a driven wheel 433 fixedly mounted on the other end of the driven gear shaft 431 and having an eccentric rod 4331 inserted through the sliding slot 1135 of the other sliding plate 113 of the body 1, and a transmission device 434 coupled between the driven gear shaft 431 and the wheel axle 222 of the wheel 221 of the spool holder 2 for causing the U-shaped frame 21 and the spool 23 of the spool holder 2 to bias upon rotation of the driven gear shaft 431.

As stated above, the coupling portion 312 of one pin 31 of the spool rotating mechanism 3 is coupled to the spool axle 231 of the spool 23, and the center gear wheel 321 of the gear set 32 is meshed with the pinion 311 at one pin 31. Therefore, when rotating the center gear wheel 321 of the gear set 32, the pinion 311 is driven to rotate the spool 23. Further, the transmission device 434 of the driven gear set 43 can be a gear transmission device, linking mechanism, or belt and roller transmission device. According to the present preferred embodiment, the transmission device 434 of the driven gear set 43 is a gear transmission device, comprising a first bevel gear 4341 fixedly mounted on the driven gear shaft 431, and a second bevel gear 4342 fixedly mounted on the wheel axle 222 of the wheel 221 of the spool holder 2 and meshed with the first bevel gear 4341. Therefore, when rotating the driven gear shaft 431 of the driven gear set 43, the second bevel gear 4342 is forced to rotate in driving the first bevel gear 4341, thereby causing the U-shaped frame 21 and spool 23 of the spool holder 2 to be biased.

During installation, the spool holder 2 is inserted into the accommodation chamber 110 inside the body 1 to have the wheel axle 222 of the wheel 221 and the pivot shaft 225 be respectively pivotally coupled to the connection portions 111 of the base 11 of the body 1 and to keep the U-shaped frame 21 in parallel to the two sliding plates 113 of the body 1. Thereafter, the pins 31 of the spool rotating mechanism 3 are respectively inserted through the narrow openings 1134 of the sliding plates 113 and the axle holes 115 of the base 11 corresponding to the spool 23, and the center gear wheel 321 of the gear set 32 of the spool rotating mechanism 3 is kept in mesh with the pinion 311 for rotating the spool 23. Thereafter, the transmission gear shaft 412 of the drive gear set 41 of the spool biasing mechanism 4 is inserted through the narrow opening 1134 of the sliding plate 113 in the right-sided sliding groove 114 of the base 11, and the driven gear shaft 431 of the driven gear set 43 is inserted through the two opposite lateral sides of the base 11 of the body 1 to have the eccentric rod 4321 of the driven gear 432 and the eccentric rod 4331 of the driven wheel 433 be inserted through the sliding slots 1135 of sliding plates 113 of the body 1 respectively, and then the transmission device 434 of the driven gear set 43 is coupled between the driven gear shaft 431 and the wheel axle 222 of the wheel 221 of the spool holder 2 for enabling the U-shaped frame 21 and the spool 23 of the spool holder 2 to be biased by means of rotating the driven gear shaft 431. Thereafter, the center axle sleeves 121 of the caps 12 are respectively coupled to the pins 31 of the spool rotating mechanism 3, and then the center wheel axle 3211 of the center gear wheel 321 and the transmission gear shaft 412 of the drive gear 411 of the drive gear set 41 are respectively connected to the handle 33 and the operating bar 42.

Referring to FIGS. 5~10, when the user operates the operating bar 42 to rotate the transmission gear shaft 412 and the drive gear 411 in the counter-clockwise direction, the operating bar 42 does not vibrate due to the effect of the protruding rod 4132 that is movable with the respective limiter plate 413 between the two stop rods 117 at one lateral side of the base 11 of the body 1 to limit the turning angle of the limiter plates 413 and the effect of the movable block 414 that is coupled to the connection rod 4131 between the two limiter plates 413 and the buffer spring 415 that is connected between one end of the movable block 414 and a rod 116 at one lateral side of the base 11 of the body 1. During counter-clockwise rotation of the drive gear 411 with the transmission gear shaft 412, the drive gear 411 drives the driven gear 432 of the driven gear set 43, causing the driven gear 432 to rotate the driven gear shaft 431, the driven wheel 433 and the transmission device 434 of the driven gear set 43, and therefore the eccentric rod 4321 of the driven gear 432 and the eccentric rod 4331 of the driven wheel 433 are moved in the sliding slots 1135 of sliding plates 113 of the body 1 to reciprocate the sliding plates 113 in the respective sliding grooves 114 of the base 11 of the body 1. At this time, the trapezoidal protrusions 1131 of the sliding plates 113 are forced against the pins 31 of the spool rotating mechanism 3 to compress the respective springs 313, causing the pins 31 to be shifted along the respective beveled guide faces 1132 of the trapezoidal protrusions 1131 of the associating sliding plates 113 to the respective top bearing faces 1133 of the associating sliding plates 113. When the pins 31 of the spool rotating mechanism 3 are respectively shifted to the respective top bearing faces 1133 of the associating sliding plates 113, the spool axle 231 and the coupling hole 232 of the spool 23 are respectively disengaged from the pins 31.

During rotation of the drive gear 411 with the transmission gear shaft 412, the transmission device 434 of the driven gear set 43 is driven to rotate the wheel axle 222 and the wheel 221, causing the guide rod 223 of the wheel 221 to be moved in the smoothly arched sliding slot 224 of the associating arm 22 of the U-shaped frame 21. When continuously rotating the drive gear 411 after the guide rod 223 of the wheel 221 reached one end of the smoothly arched sliding slot 224 of the associating arm 22 of the U-shaped frame 21, the U-shaped frame 21 and the spool 23 of the spool holder 2 will be turned about the axis of the axle 222 through 90-degrees leftwards (or rightwards), moving the spool 23 to a vertical (or horizontal) position.

Further, as stated above, the return spring 226 is coupled between the pivot shaft 225 and the U-shaped frame 21 and adapted for returning the pivot shaft 225 after each rotary motion, when the force that bias the U-shaped frame 21 and the spool 23 of the spool holder 2 is disappeared, the return spring 226 immediately reverse the pivot shaft 225, returning the spool holder 2 to its former position.

When the user is going to swing the fishing pole 5 in throwing the fishing line 6 and the bait at the hook of the fishing line 6 to the water, the user can rotate the operating bar 42 in the counter-clockwise direction to bias the spool holder 2 90-degrees leftwards relative to the base 11 of the body 1, keeping the spool 23 in parallel to the fishing pole 5, and enabling the fishing line 6 to be extended out of the spool 23 along the guide groove 325 of the smoothly arched slide 324. When swinging the fishing pole 5 to throw the fishing line 6 as the spool 23 is kept in parallel to the fishing pole 5, the fishing line 6 does not carry the spool 23 to rotate, and therefore less resistance is produced against the fishing line 6 and the fishing line 6 can be rapidly extended out of the spool 23 and thrown into the water for a long distance (see FIG. 11).

Figure 12:
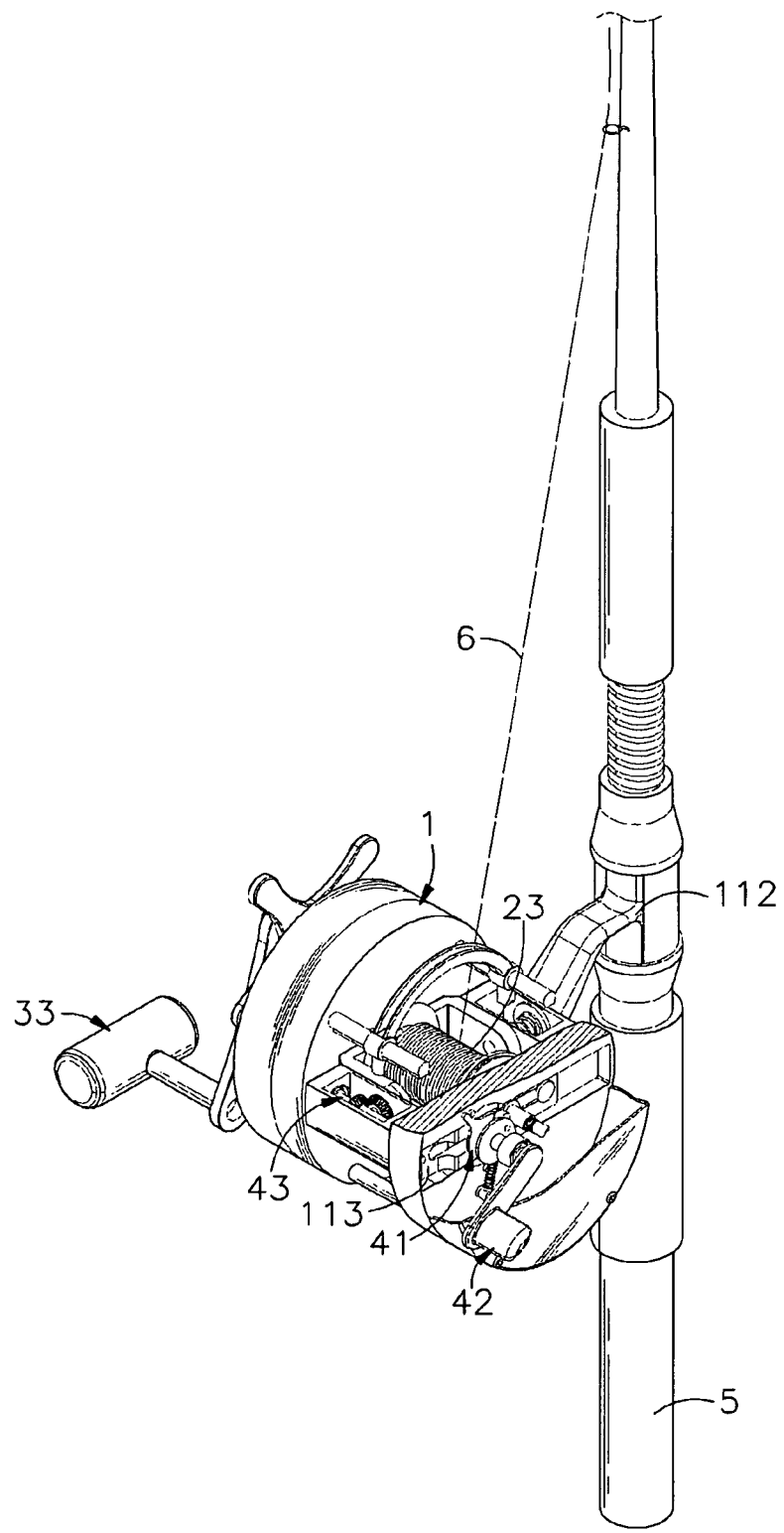
FIG. 12 corresponds to FIG. 1, showing the spool holder in the horizontal position.
Figure 13:
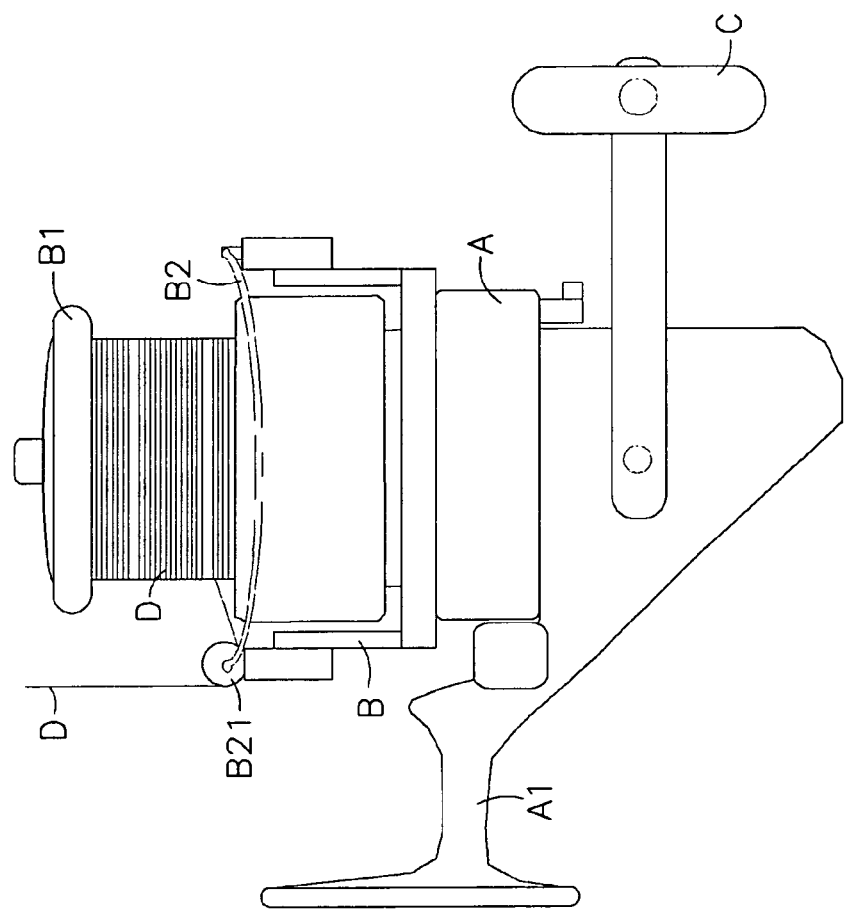
FIG. 13 illustrates a spinning reel according to the prior art.
Figure 14:
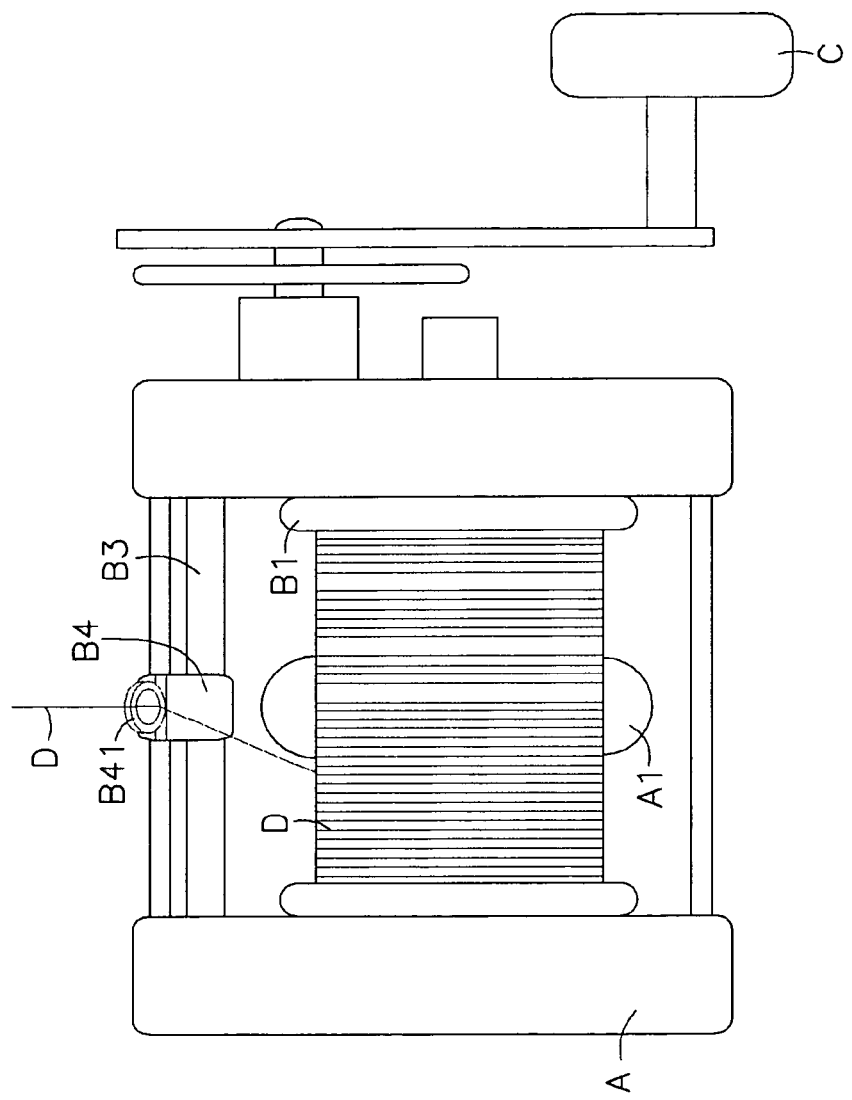
FIG. 14 illustrates a trolling reel according to the prior art.

When wishing to take up the fishing line 6, rotate the operating bar 42 in the clockwise direction, biasing the spool holder 2 90-degrees rightwards from the vertical position in parallel to the fishing pole 5 to the horizontal position perpendicular to the fishing pole 5, and then operate the handle 33 of the spool rotating mechanism 3 to rotate the spool 23, causing the spool 23 to take up the fishing line 6, and therefore the fishing line 6 is moved backwards along the guide groove 325 of the smoothly arched slide 324 and smoothly wound round the spool 23 under a high pull-out force (see FIG. 12).

According to the spinning reel described above, the spool holder 2 of the spinning reel is accommodated in the base 11 of the body 1 with the wheel axle 222 and the pivot shaft 225 respectively pivoted to the two connection portions 111 of the base 11 of the body 1; the pins 31 of the spool rotating mechanism 3 are respectively inserted through the narrow openings 1134 of the sliding plates 113 and the axle holes 115 of the base 11 and axially movable between the first position to engage the spool 23 of the spool holder 2 and the second position to release the spool 23 so that the spool rotating mechanism 3 can be operated to rotate the spool 23 when the pins 31 are in engagement with the spool 23; the transmission gear shaft 412 of the drive gear set 41 of the spool biasing mechanism 4 is inserted through the narrow opening 1134 of the sliding plate 113 in the right-sided sliding groove 114 of the base 11 and connectable to the operating bar 42, and the driven gear shaft 431 of the driven gear set 43 is rotatably inserted through the two opposite lateral sides of the base 11 of the body 1, for enabling the eccentric rod 4321 of the driven gear 432 and the eccentric rod 4331 of the driven wheel 433 to be respectively inserted through the sliding slots 1135 of the sliding plates 113 of the body 1; the transmission device 434 of the driven gear set 43 is coupled between the driven gear shaft 431 and the wheel axle 222 of the wheel 221 of the spool holder 2 for causing the U-shaped frame 21 and the spool 23 of the spool holder 2 to bias between the vertical position and horizontal position upon rotation of the driven gear shaft 431.

When the user rotates the operating bar 42 in the clockwise or counter-clockwise direction, the drive gear set 41 is forced to rotate the driven gear set 43 and to further move the sliding plates 113 of the body 1 in forcing the pins 31 away from the spool 23, for enabling the transmission device 434 of the driven gear set 43 to bias the spool 23 90-degrees leftwards or rightwards to the vertical or horizontal position. When the spool 23 is biased to the vertical position, the user can throw the fishing line 6 efficiently with less effort. When the spool 23 is biased to the horizontal position, the user can rotate the spool 23 to take up the fishing line 6 smoothly with less effort.

Although a particular embodiment of the invention has been described in detail for purposes of illustration, various modifications and enhancements may be made without departing from the spirit and scope of the invention.

What the invention claimed is:

1. A spinning reel comprising:
a body, said body comprising a base, said base comprising an accommodation chamber, two connection portions respectively disposed at front and back sides thereof, and two sliding plates coupled to two opposite lateral sides of said base;
a spool holder accommodated in said accommodation chamber, said spool holder comprising a U-shaped frame pivotally coupled between said two connection portions of said base and a spool perpendicularly pivotally coupled to said U-shaped frame;
a spool rotating mechanism, said spool rotating mechanism comprising two pins axially movable between a first position where said pins are respectively coupled to said spool and a second position where said pins are respectively disengaged from said spool, and a gear set mounted on one said pin for rotating said spool to take up a fishing line; and
a spool biasing mechanism, said spool biasing mechanism comprising a drive gear set, a operating bar for operation by a person to rotate said drive gear set, a driven gear set coupled to said drive gear set and rotatable to move said sliding plates of said body in moving said pins of said spool rotating mechanism between said first position and said second position, and a transmission device coupled between said driven gear set and said spool holder for causing said spool holder to be biased between a horizontal position and a vertical position upon rotation of said drive gear set by said operating bar.

2. The spinning reel as claimed in claim 1, wherein said body further comprises a pole mount extending from one said connection portion of said base for fastening to a fishing pole.

3. The spinning reel as claimed in claim 1, wherein said base of said body comprises two sliding grooves disposed at the two opposite lateral sides thereof; said sliding plates are respectively slidably coupled to said sliding grooves of said base, each having a trapezoidal protrusion, a narrow opening cut through said trapezoidal protrusion corresponding to said sliding grooves of said base and respectively coupled to said pins of said spool rotating mechanism, and a sliding slot disposed near one end and extending in direction perpendicular to the extending direction of said narrow opening and coupled to said driven gear set.

4. The spinning reel as claimed in claim 3, wherein said base of said body comprises two axle holes axially aligned at two opposite lateral sides of said accommodation chamber; said pins of said spool rotating mechanism are respectively inserted through said narrow openings of said sliding plates and into said axle holes of said base for connection to said spool.

5. The spinning reel as claimed in claim 3, wherein said driven gear set of said spool biasing mechanism comprises a driven gear shaft rotatably inserted through the two opposite lateral sides of said base of said body, a driven gear fixedly mounted on one end of said driven gear shaft and meshed with said drive gear set and having an eccentric rod inserted through said sliding slot of one said sliding plate of said body, a driven wheel fixedly mounted on an opposite end of said driven gear shaft and having an eccentric rod inserted through said sliding slot of the other said sliding plate of said body.

6. The spinning reel as claimed in claim 3, wherein the trapezoidal protrusion of each said sliding plate of said body has a top bearing face and a beveled guide face at one side of said top bearing face for moving said pins of said spool rotating mechanism between said first position and said second position.

7. The spinning reel as claimed in claim 1, wherein said U-shaped frame of said spool holder comprises a first arm and a second arm arranged in parallel and respectively pivotally coupled to said connection portions of said base of said body, a smoothly arched sliding slot cut through said first arm near a free end of said first arm, a wheel, which has a wheel axle inserted through said first arm and coupled to one said connection portion of said base of said body and rotatably by said transmission device of said spool biasing mechanism and a guide rod inserted into said smoothly arched sliding slot of said first arm to guide rotary motion of said wheel relative to said U-shaped frame within a limited angle.

8. The spinning reel as claimed in claim 7, wherein said U-shaped frame further comprises a pivot shaft perpendicularly extending from said second arm and pivotally coupled to the other said connection portion of said base of said body, and a return spring connected between said second arm and said base of said body.

9. The spinning reel as claimed in claim 7, wherein said transmission device of said spool biasing mechanism can be a gear transmission device, linking mechanism, or belt and roller transmission device, comprises a first bevel gear fixedly mounted on said driven gear shaft, and a second bevel gear fixedly mounted on said wheel axle of said wheel of said U-shaped frame of said spool holder and meshed with said first bevel gear.

10. The spinning reel as claimed in claim 1, wherein said spool has a spool axle axially disposed at one end thereof and a coupling hole axially disposed at an opposite end thereof; said pins of said spool rotating mechanism includes a first pin for coupling to said spool axle of said spool and a pinion fixedly mounted on the periphery thereof and meshed with a gear set of said spool rotating mechanism, and a second pin that has one end connectable to said coupling hole of said spool and a collar extending around the periphery thereof.

11. The spinning reel as claimed in claim 10, wherein said first pin has a coupling portion disposed at one end thereof for coupling to said spool axle of said spool; said second pin has one end configured for inserting into said coupling hole of said spool.

12. The spinning reel as claimed in claim 10, wherein said body further comprises two caps respectively capped on the two opposite lateral sides of said base, said caps each having a center axle sleeve respectively coupled to said pins of said spool rotating mechanism; said spool rotating mechanism further comprises two compression springs respectively sleeved onto said pins and stopped between said collars of pins and said center axle holders of said caps.

13. The spinning reel as claimed in claim 10, wherein said gear set of said spool rotating mechanism comprises a center gear wheel meshed with said pinion and rotatable to drive said pinion in rotating said spool, two transmission gears meshed with said center gear wheel at two opposite lateral sides, two guide rods respectively fixedly connected to said transmission gears and suspending in said accommodation chamber of said base of said body, and a smoothly arched slide coupled to said guide rods and defining a guide groove for guiding a fishing line toward said spool for winding.

14. The spinning reel as claimed in claim 13, wherein said center gear wheel has a wheel axle; said spool rotating mechanism further comprises a handle connected said wheel axle of said center gear wheel with nuts and a packing member.

15. The spinning reel as claimed in claim 1, wherein said drive gear set of said spool biasing mechanism comprises a drive gear, a transmission gear shaft fixedly connected to said drive gear and inserted through said narrow opening of one said sliding plate of said base of said body, and two limiter plates coupled between said transmission gear shaft and said operating bar.

16. The spinning reel as claimed in claim 15, wherein said drive gear set of said spool biasing mechanism further comprises a movable block suspending between said two limiter plates, said movable block having an elongated slot, a connection rod inserted through said elongated slot of said movable block and eccentrically connected between said two limiter plates, and a buffer spring connected between one end of said movable block and one lateral side of said base of said body, one said limiter plate having a protruding rod protruded from the periphery thereof and movable with said limiter plates between two stop rods at one lateral side of said base of said body.

\* \* \* \* \*